US012581046B2

(12) United States Patent (10) Patent No.: US 12,581,046 B2

Purdy (45) Date of Patent: Mar. 17, 2026

(54) PATHOLOGY REVIEW STATION

(71) Applicant: FAXITRON BIOPTICS, LLC,
Tucson, AZ (US)

(72) Inventor: Ciaran Purdy, Tucson, AZ (US)

(73) Assignee: Faxitron Bioptics, LLC, Marlborough,
MA (US)

( * ) Notice: Subject to any disclaimer, the term of this
patent is extended or adjusted under 35
U.S.C. 154(b) by 642 days.

(21) Appl. No.: 17/910,652

(22) PCT Filed: Mar. 26, 2021

(86) PCT No.: PCT/US2021/024349
§ 371 (c)(1),
(2) Date: Sep. 9, 2022

(87) PCT Pub. No.: WO2021/195490
PCT Pub. Date: Sep. 30, 2021

(65) Prior Publication Data
US 2023/0137665 A1     May 4, 2023

Related U.S. Application Data

(60) Provisional application No. 63/001,038, filed on Mar.
27, 2020.

(51) Int. Cl.
*H04N 9/31*      (2006.01)
*G01N 23/04*     (2018.01)
*G01N 23/083*    (2018.01)

(52) U.S. Cl.
CPC ........... *H04N 9/3185* (2013.01); *G01N 23/04*
(2013.01); *G01N 23/083* (2013.01); *G01N*
*2223/04* (2013.01)

(58) Field of Classification Search
USPC ....................................................... 382/128
See application file for complete search history.

(56) References Cited

U.S. PATENT DOCUMENTS

2011/0207169 A1*   8/2011   Markin ................... B01L 3/505
                                                            435/40.52
2014/0326083 A1   11/2014   Basque et al.
(Continued)

FOREIGN PATENT DOCUMENTS

EP          2 930 635 A1    10/2015
WO          2021/174078      9/2021
WO     WO-2021174078 A1 *    9/2021    ............. G06T 19/20

OTHER PUBLICATIONS

International Search Report and Written Opinion of the International Searching Authority for International Patent Application No. PCT/US2021/024349 mailed Jul. 19, 2021, 12 pages.
(Continued)

*Primary Examiner* — Jacky X Zheng
(74) *Attorney, Agent, or Firm* — Merchant & Gould P.C.

(57)     ABSTRACT

Systems and methods for a pathology review station are disclosed. The pathology review station may assist pathologists in analyzing, slicing, or sampling specimens by, in part, projecting an image onto a specimen. The process of projecting an image onto a specimen may include identification of the specimen based on characteristics of the specimen, characteristics of a tray supporting the specimen, or user input. The identified specimen may then be matched with an image obtained by an imager received at the pathology review station. A projected image may then be compiled based on the obtained image, which may include the entire image or features associated with the image. The provided systems and methods may assist a pathologist in, at least, removal of embedded surgical markers and/or determining where to take samples from a specimen.

13 Claims, 9 Drawing Sheets

(56) References Cited

U.S. PATENT DOCUMENTS

| 2015/0279032 | A1* | 10/2015 | Hall | ....................... | G16H 30/20 |
| | | | | | 382/128 |
| 2016/0086380 | A1* | 3/2016 | Vayser | ................... | A61B 90/36 |
| | | | | | 345/633 |
| 2016/0367992 | A1 | 12/2016 | Purdy et al. | | |
| 2017/0079741 | A1 | 3/2017 | Makinouchi | | |
| 2021/0327590 | A1* | 10/2021 | Walter | ................... | G16H 40/20 |

OTHER PUBLICATIONS

PCT International Preliminary Report on Patentability in International Patent Application No. PCT/US2021/024349 mailed Oct. 6, 2022, 10 pages.

* cited by examiner

Figure 8

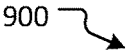

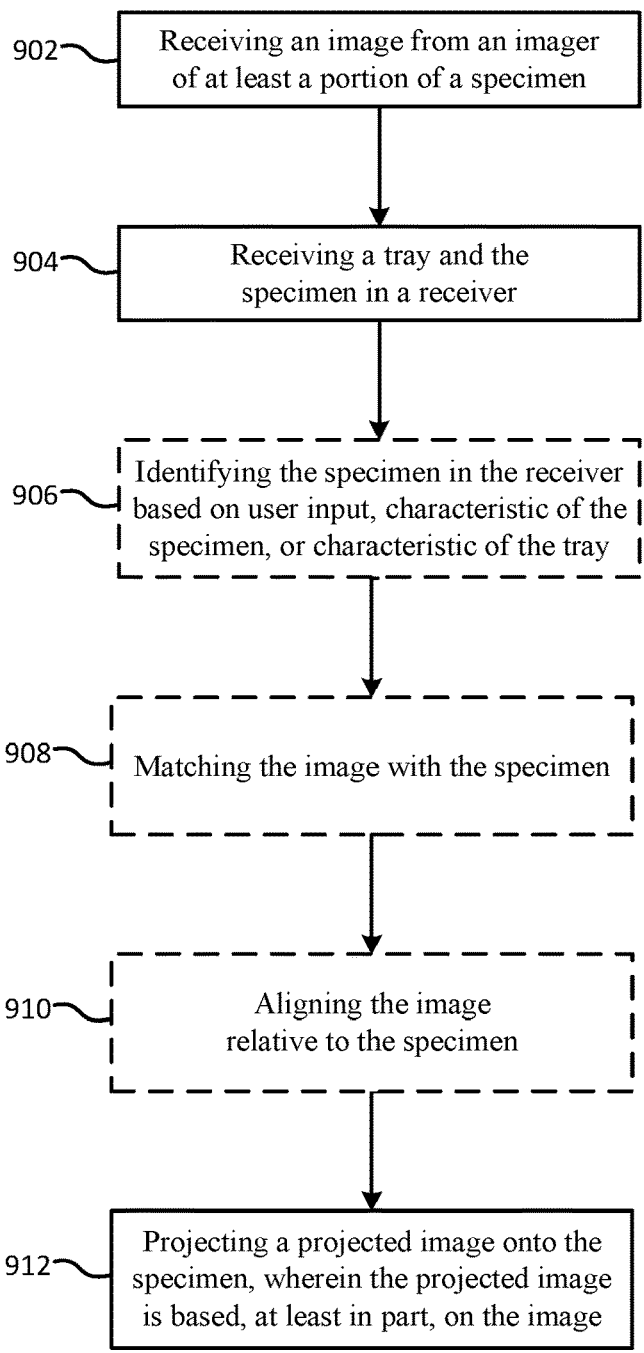

900

902 — Receiving an image from an imager of at least a portion of a specimen

904 — Receiving a tray and the specimen in a receiver

906 — Identifying the specimen in the receiver based on user input, characteristic of the specimen, or characteristic of the tray 908 — Matching the image with the specimen 910 — Aligning the image relative to the specimen 912 — Projecting a projected image onto the specimen, wherein the projected image is based, at least in part, on the image

Figure 9

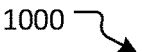
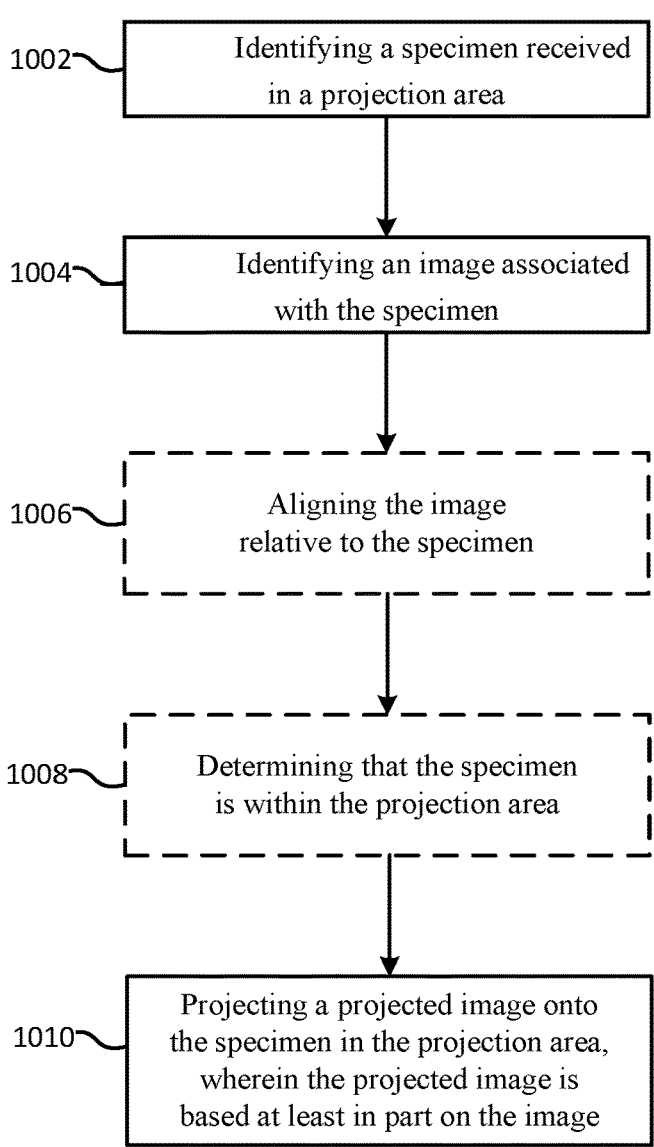
1000
1002 — Identifying a specimen received in a projection area
1004 — Identifying an image associated with the specimen
1006 — Aligning the image relative to the specimen
1008 — Determining that the specimen is within the projection area
1010 — Projecting a projected image onto the specimen in the projection area, wherein the projected image is based at least in part on the image
Figure 10

PATHOLOGY REVIEW STATION

CROSS-REFERENCE TO RELATED APPLICATIONS

This application is a National Stage Application of PCT/US2021/024349, filed Mar. 26, 2021, which claims the benefit of U.S. Provisional Application No. 63/001,038, filed Mar. 27, 2020, the complete disclosures of which are hereby incorporated herein by reference in their entireties. To the extent appropriate, a claim of priority is made to each of the above disclosed applications.

INTRODUCTION

Lumpectomy techniques are used for removing cancerous or other abnormal tissue from a breast. A lumpectomy is a breast-conserving surgery that only removes a portion of the breast. The excised tissue is sent to a pathologist to evaluate if the tissue is benign or malignant. The pathologist may also determine if there is an acceptable margin between any cancerous or abnormal tissue and the exterior surface of the excised tissue.

Procedures used during pathology to slice the excised tissue and/or take samples from the excised tissue are vitally important to determine if all cancerous or abnormal tissue has been removed from the breast. If any amount of cancerous or abnormal tissue remains in the breast, then those cells could grow and otherwise spread throughout the body. Thus, it is important for the pathologist to be accurate when sampling or analyzing the excised tissue.

Additionally, pathologists may need to remove a surgical marker from the excised tissue. Markers are often used during surgery to direct a surgeon to remove a specific portion of the tissue identified by a radiologist. After excising the tissue identified by the surgical marker, the surgical marker is encased inside the excised tissue. In some instances, the marker may need to be tracked and/or isolated (for example, if the marker emits radiation). Quick and accurate removal of the marker from the excised tissue by the pathologist may be required.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to a pathology review station. In an aspect, the technology relates to a method for projecting an image onto a specimen at the pathology review station. The method includes receiving an image from an imager of at least a portion of a specimen and receiving a tray and the specimen in a receiver. The method further includes projecting a projected image onto the specimen, wherein the projected image is based at least in part on the image.

In an example, the projected image comprises the image. In another example, the method further includes identifying the specimen in the receiver based on at least one of the following: a user input, a characteristic of the specimen, and a characteristic of the tray. In a further example, the characteristic of the specimen is at least one of: a contour of the specimen and a map of the specimen. In yet another example, the characteristic of the tray is at least one of: a grid on the tray and a marker on the tray. In still a further example, the method further includes aligning the projected image relative to the specimen based at least in part on the operation of identifying the specimen. In another example, the specimen is a plurality of specimen slices. In a further example, the projected image further comprises a recommended incision line.

In another aspect, the technology relates to a computer-implemented method of projecting an image onto a specimen. The method includes identifying a specimen received in a projection area and identifying an image associated with the specimen. The method further includes projecting a projected image onto the specimen in the projection area, wherein the projected image is based at least in part on the image.

In an example, the operation of identifying the specimen is based on at least one or more of the following: a user input, a characteristic of the specimen, and a characteristic of a tray. In another example, the method further includes aligning the projected image relative to the specimen based at least in part on the operation of identifying the specimen. In a further example, the method further includes determining that the specimen is within the projection area, and based on the determination that the specimen is within the projection area, automatically projecting the projected image onto the specimen. In yet another example, the projected image includes the image. In still a further example, the projected image includes a recommended incision line. In another example, the specimen is a plurality of specimen slices.

In another aspect, a pathology review station is disclosed. The pathology review station includes a specimen receiver configured to receive a specimen, a processor, and memory storing computer executable instructions that, when executed by the processor, cause the pathology review station to perform a set of operations. The set of operations includes receiving an x-ray image of a specimen from an x-ray imager, and generating a projected image based at least in part on the x-ray image. The pathology review station further includes a projector configured to project the projected image onto the specimen.

In an example, the specimen receiver is further configured to receive a tray supporting the specimen. In another example, the set of operations further includes identifying the specimen based on one or more of: a user input, a characteristic of the specimen, and a characteristic of the tray; and based on identifying the specimen, aligning the projected image with the specimen. In a further example, the pathology review station and the x-ray imager are housed in a single unit. In yet another example, the pathology review station further includes a support stand, the support stand configured to position the projector above the specimen receiver.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The accompanying figures illustrate one or more aspects of the disclosed methods and systems for a pathology review

Figure 1:
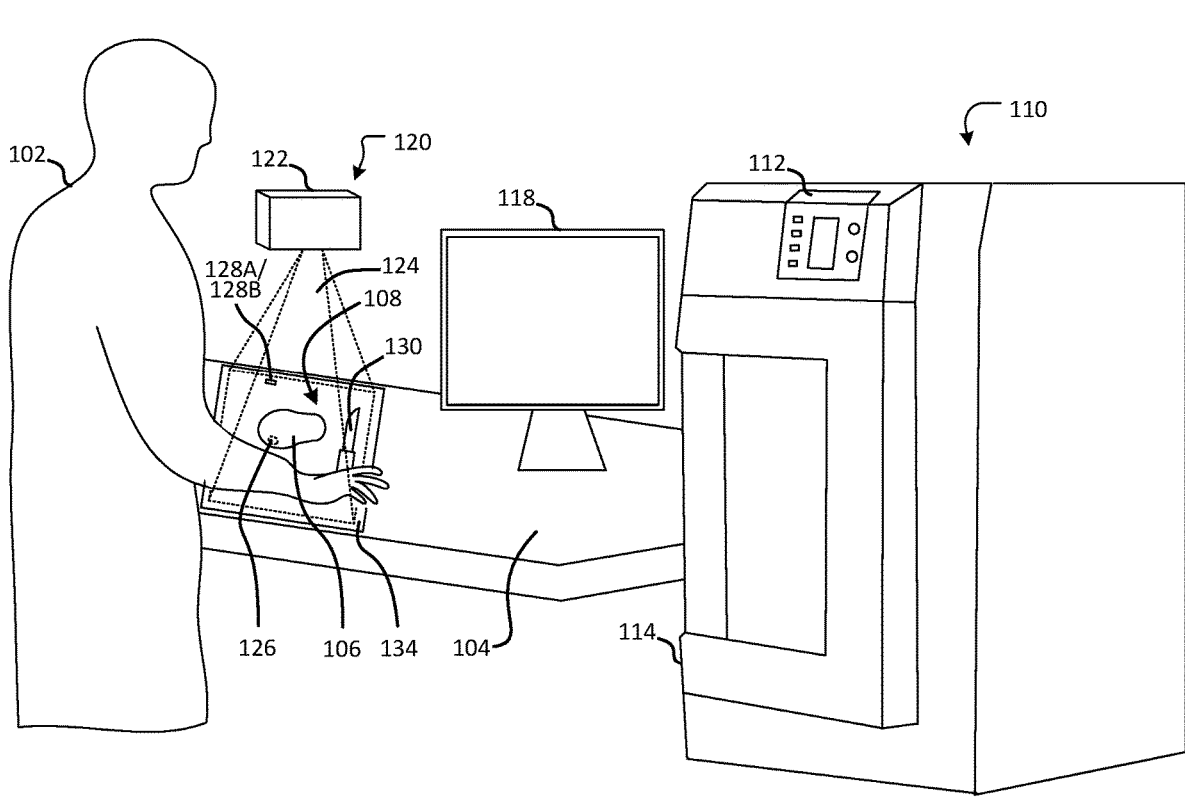

3 station. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Non-limiting and non-exhaustive examples are described with reference to the following figures:

FIG. 1 depicts a pathology work area with a pathologist analyzing a specimen at a pathology review station.

Figure 2:
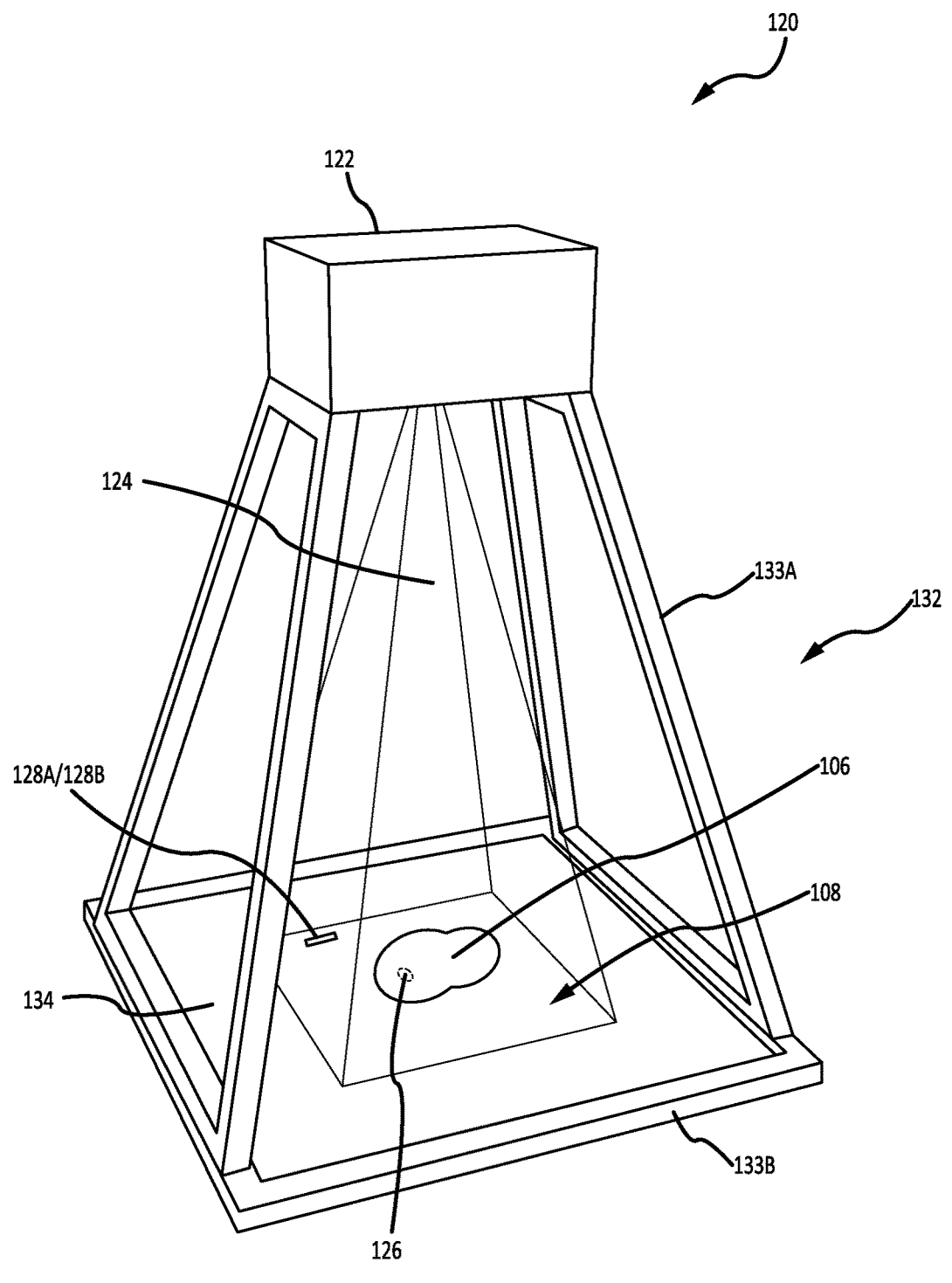

FIG. 2 depicts a pathology review station of a pathology work area.

Figure 3:
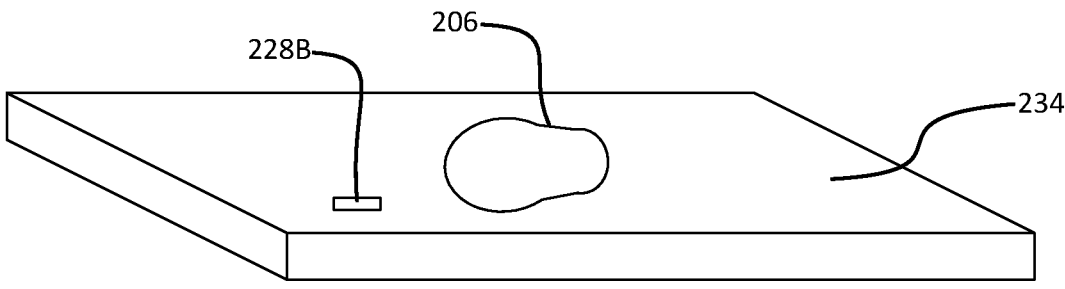

FIG. 3 depicts a specimen setup in a pathology work area.

Figure 4:
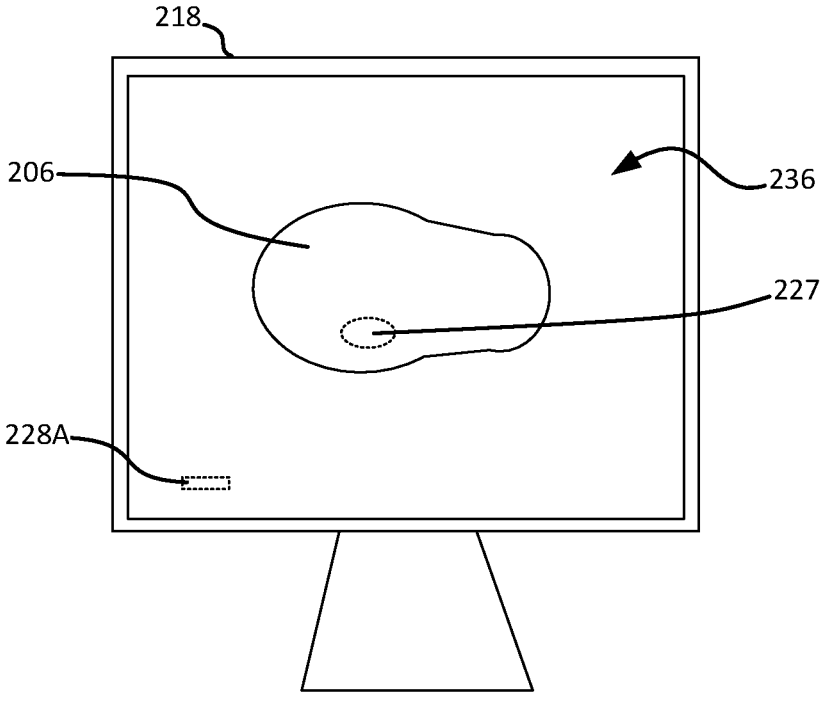

FIG. 4 depicts a display of an image of specimen slices in a pathology work area.

Figure 5:
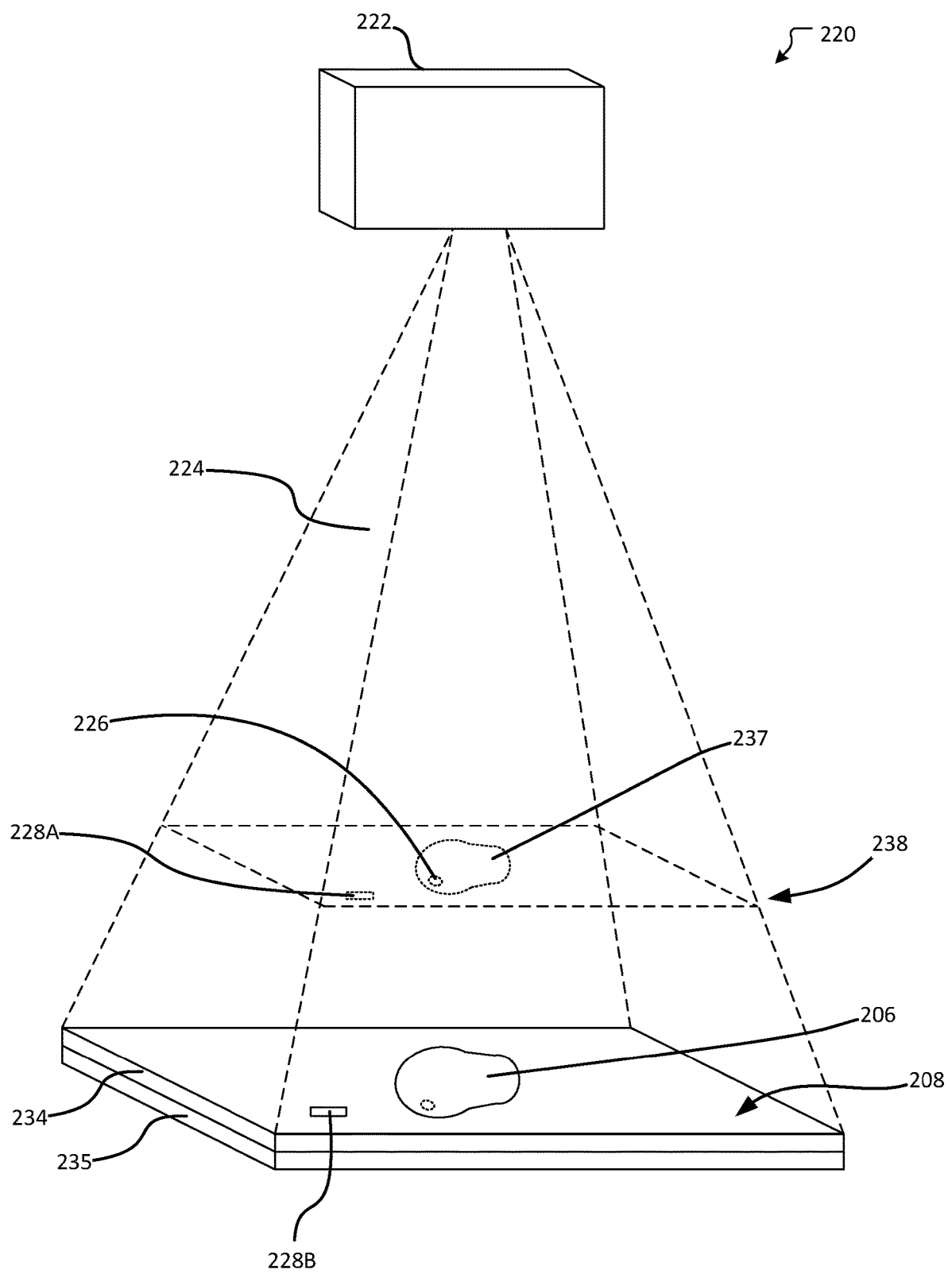

FIG. 5 depicts a pathology review station of a pathology work area projecting a projected image onto the specimen.

Figure 6:
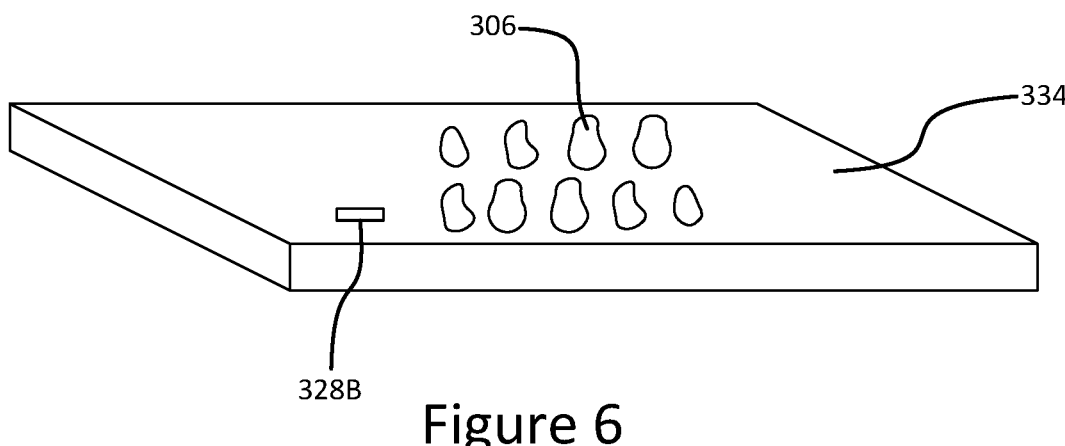

FIG. 6 depicts specimen slices of a grossed specimen, setup in a pathology work area.

Figure 7:
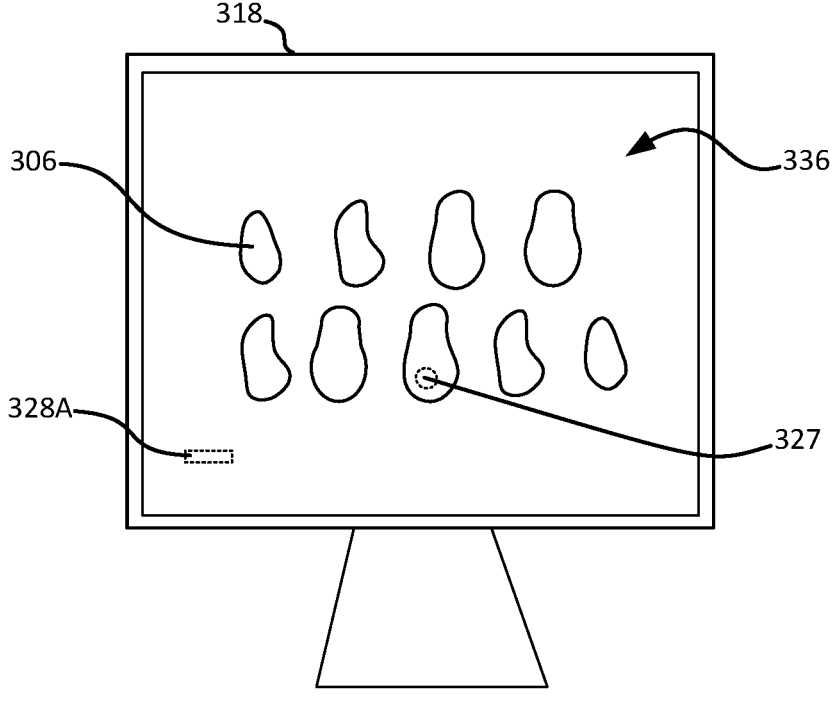

FIG. 7 depicts a display of an image of specimen slices in a pathology work area.

Figure 8:
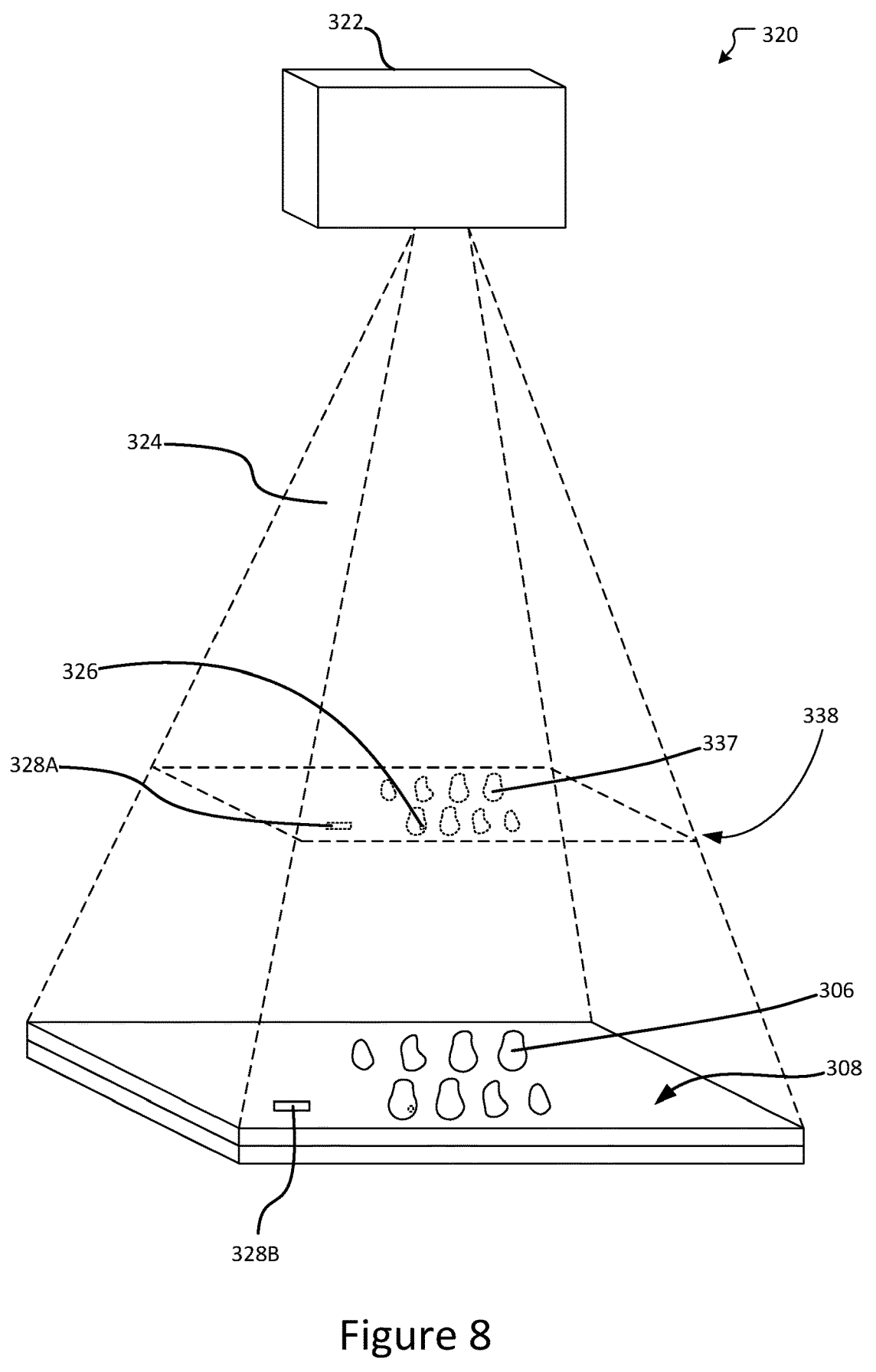

FIG. 8 depicts a pathology review station of a pathology work area projecting a projected image onto the specimen slices.

FIG. 9 illustrates a method for projecting an image onto a specimen.

FIG. 10 illustrates a method for identifying an image and projecting an image onto a specimen.

Figure 11:
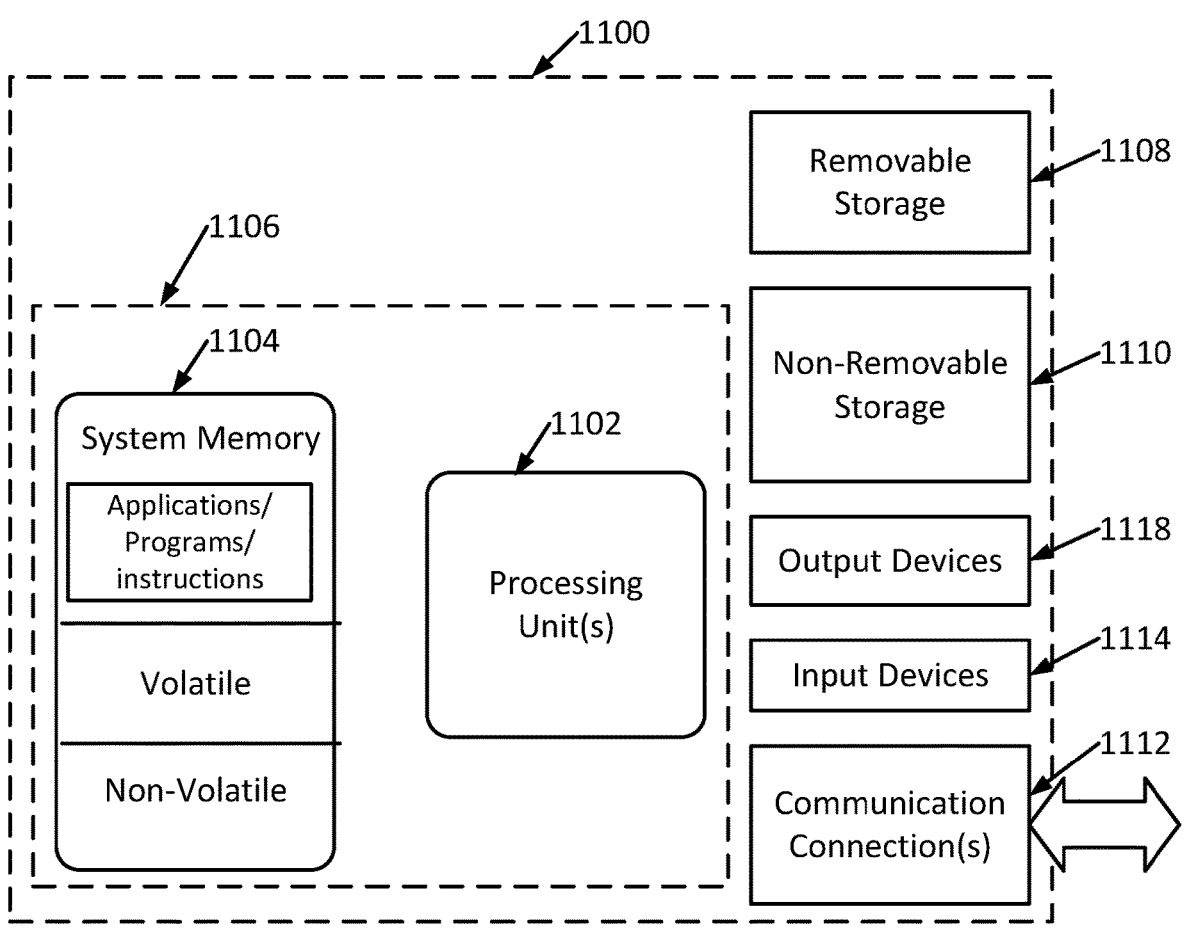

FIG. 11 illustrates an example suitable operating environment for a pathology review station.

While examples of the disclosure are amenable to various modifications and alternate forms, specific examples have been shown by way of example in the drawings and are described in detail below. The intention is not to limit the scope of the disclosure to the particular examples described. On the contrary, the disclosure is intended to cover all modifications, equivalents, and alternatives falling within the scope of the disclosure and the appended claims.

DETAILED DESCRIPTION

Various aspects of the disclosure are described more fully below, with reference to the accompanying drawings, which show specific example aspects. However, different aspects of the disclosure may be implemented in many different forms and should not be construed as limited to the aspects described herein; rather, these aspects are provided so that this disclosure will be thorough and complete, and will fully convey the scope of the aspects to those skilled in the art. Aspects may be practiced as methods, systems, or devices. The following detailed description is, therefore, not to be interpreted in a limiting sense.

One method of removing cancerous or abnormal cells is a breast-conserving procedure called a lumpectomy. After tissue is excised by a surgeon, the tissue specimen may be analyzed by a pathologist to determine if the tissue is cancerous and if there is a sufficient margin between cancerous or abnormal tissue and the exterior surface of the specimen. Sufficient margins may be dictated by best practices, hospital requirements, or other considerations. The process may then be repeated.

Once a specimen is received by pathology, an image is taken of the whole specimen, as received. In certain embodiments, the image may be an x-ray image. It is also contemplated that the image may be an optical image, CT image, contrast enhanced image and/or other images taken using known imaging modalities. After imaging the specimen, the image is viewed by a pathologist to determine where to slice the specimen to remove any embedded surgical markers. After removing surgical markers, the specimen is sliced (or "grossed") into several pieces using a slicing instrument 130, and imaged again. The x-ray image of the grossed specimen (or specimen slices) is viewed by the pathologist to determine where to take samples from the specimen for further analysis.

Accuracy and speed is desirable for this process. For example, if a pathologist does not accurately slice a specimen to remove a surgical marker, then the surgical marker may not be retrieved, or the specimen may be sliced in a way that interferes with later analysis. Moreover, if the pathologist does not accurately determine where to take samples from the specimen, then improper analysis may be performed, which could lead to misdiagnosis or inability to identify cancerous or abnormal tissue. Speed is also a desirable factor in the pathology process. For example, retrieval of surgical markers needs to be done quickly to ensure that a medical facility keeps track of any markers that emit radiation. Additionally, fast turnarounds of tissue analysis and lumpectomy results is preferable to determine if further surgery is required or desired, and provide a status update to the patient. If another example, the analysis could be performed during surgery. This "live" analysis could prevent rescheduling of additional surgeries by informing the surgeon that additional tissue should be taken before concluding surgery, and may also allow specimen orientation relative to the patient to be more easily maintained for additional excising.

The current pathology setup, however, does not promote accuracy or efficiency. Pathologists currently compare x-ray images side-by-side with the specimen being examined to determine where to slice and/or sample the specimen. This approximation procedure, performed simply by sight, is often not accurate to determine where to cut the specimen and sample from the specimen, as it is an approximation based on an image positioned away from the actual specimen. Additionally, the visual comparison between the image and the specimen to determine where to slice/sample the specimen is slow and inefficient.

Accordingly, the present disclosure provides systems and methods for a pathology review station that, in part, promotes accuracy and efficiency for pathology analysis of a specimen. In an example, the present disclosure provides methods and systems for projecting an image onto a specimen. As a further example, a projected image, which may be all or a portion of an image or based on an image or features of an image, may be projected onto a specimen obtained from a lumpectomy to assist a pathologist in slicing the specimen (e.g., to retrieve a marker used during surgery or gross a specimen into smaller specimen pieces) and/or sampling the specimen for further analysis. By projecting an image onto the specimen, a pathologist may more accurately and more quickly determine where to slice and/or sample the specimen.

Although aspects of the present disclosure are described with respect to pathology analysis of excised breast tissue, it should be appreciated that the present disclosure may also be useful in variety of other applications where an image is projected (e.g., x-ray image, camera image, infrared image, CT scan, MRI, ultrasound, PET, or any other imaging) onto a specimen, tissue, bone, living organism, body part, or any other object, living or dead.

As an example, FIG. 1 depicts a pathology work area 100 with a pathologist 102 analyzing a tissue specimen 106 at a pathology review station 120. As described herein, a pathologist 102 may receive a specimen 106 to be analyzed in the pathology work area 100. In this example, for clarity, the specimen includes excised tissue that may be analyzed using an imager 110. As an example, FIG. 1 illustrates a work area 100 that may include a work table 104, imager 110, display 118, and pathology review station 120. The imager 110 may be any variety of imaging equipment, as described herein, such as an x-ray imager, camera, infrared imager, CT scanner, MRI, ultrasound, PET, or any other imager capable of imaging a specimen. The imager 110 may have an imager interface with controls to allow the pathologist 102 to select preferences associated with imaging by the imager 110, and an imager door 114 that may allow the specimen 106 to be placed inside of the structure of the imager 110. The imager 110 may also include a display 118 and/or a pathology review station 120. The imager 110, display 118, and pathology review station 120 may, in any combination, be housed in a single unit. Alternatively, the imager 110, display 118, and pathology review station 120 may be separate units.

The display 118 may show all or part of an image obtained by the imager 110 upon imaging the specimen 106. As required or desired, the image obtained by the imager 110 may be manipulated by a pathologist. For example, the pathologist may select the entire image or only a portion of the image sent to the display 118 and/or provided to the pathology review station 120. As another example, the pathologist may zoom in or out of the image. Additionally or alternatively, the pathologist may manipulate other aspects of the image, or a part of the image. For example, the pathologist may add one or more features to the image that may be sent to the display 118 and/or the pathology review station 120, such as text, shapes, pointers, etc. As another example, the pathologist may delete or erase one or more portions of the image, which may then be sent to the display 118 and/or pathology review station 120. The image may be provided via any type of connection, such as a wired connection, a network, a wireless connection (e.g., Bluetooth), stored on a USB, or any other portable storage medium to communicate the image from the imager 110 to the display 118. In addition, or as an alternative, to showing all or part of the image of the specimen 106 on the display 118, all or part of the image of the specimen 106 may be sent to the pathology review station 120.

The pathology review station 120 may be configured to project the image onto all or part of the specimen 106 using a projector 122. The projector 122 may be a digital light processing (DLP) projector, a liquid crystal display (LCD) projector, cathode ray tube (CRT) projector, laser, augmented reality (AR) or virtual reality (VR) virtual overlay, etc., to overlay all or part of the image of the specimen 106 onto the specimen 106. The projector 122 may be positioned in any orientation about the specimen 106. For example, the projector 122 may be placed above, below, or at any angle in relation to the specimen 106 to project all or part of the image. The projector 122 may be secured into place by a structure or support (not shown), such as a hanger, suspension device, support legs, frame, etc., to stabilize the projector 122 or hold the projector 122 in place. Additionally or alternatively, the projector 122 may be movable and/or repositionable in relation to the specimen 106, display 118, and/or imager 110.

The projector 122 may be configured to overlay a projected image 124 onto the specimen 106. The projected image 124 may include the entire image obtained by the imager 110, a portion of the image, a feature 126 of the image (e.g., a calcification, abnormal cells, a surgical marker, an interest area, a projected image marker 128A) or any other feature identifiable in the image that may or may not be visible on the specimen 106, a recommended incision line, a recommended sample area, a margin from the exterior, or any other feature that may be helpful to a pathologist.

Although aspects discussed herein describe one image being projected onto a specimen 106, it should be appreciated that the projected image 124 may include multiple images, multiple portions of images, or multiple features of images, and in any combination obtained by one or more imagers 110 of one or more types, as described herein.

The pathology review station 120 may additionally identify or detect a location, position, or presence of a specimen 106. Identification or detection of the specimen 106 may use a characteristic of the specimen 106, a characteristic of the tray 134, or any other characteristic identifiable on the specimen 106, tray 134, surrounding area, or projection area 108. Characteristics of the specimen 106 may include a contour of the specimen 106, a shape or size of the specimen 106, a map of multiple calcifications existing on the specimen 106, a map of multiple pieces of specimen 106, or any other features identifiable on the specimen 106, in any combination. Characteristics of the tray 134 may include a tray marker 128B, a grid on the tray 134, labels on the tray 134, or any other characteristics identifiable on the tray 134, in any combination. Additionally or alternatively, a pathologist 102 may identify or confirm identification of the specimen 106 manually.

Additionally, the pathology review station 120 may identify an image obtained by an imager 110 using a feature of the image. Features of the image may include imaged contours of the specimen 106, imaged shape(s) or size(s) of the specimen 106, an imaged map of multiple calcifications existing on the specimen 106, an imaged map of multiple pieces of specimen 106, an imaged tray marker of the tray 134, an imaged grid on the tray 134, imaged labels on the tray 134, or any other features identifiable in the image obtained by the imager 110, in any combination.

The identification or detection of the specimen 106 may be used to match an image with the identified specimen 106, align an image with the identified specimen 106, automatically project a matched image onto the identified specimen 106 when the specimen 106 is in a projection area 108 of the projector 122, reorient an image relative to a re-positioned specimen 106, identify specimen orientation relative to a patient from which the tissue was excised, or any other use of specimen identification by the pathology review station 120, in any combination. The pathology review station 120 may match an image obtained by the imager 110 with the identified specimen 106 by comparing a characteristic of the specimen 106 or a characteristic of the tray 134 with a feature of the image. The matching may use one or more characteristics of each the specimen, tray, and/or image. Matching of an image with a specimen 106 may also be performed manually by the pathologist 102.

The pathology review station 120 may also align a matched image with the identified specimen 106. A projected image 124 may be projected onto the specimen 106, based on the matched image. As described above, the projected image may be the entire matched image obtained by the imager 110, one or more portions of the image, one or more features of the image that are a part of the image or are overlaid onto the image, or any other object associated with the image, in any combination. Alignment of the projected image 124 with the specimen 106 may be determined using a variety of methods, such as manual input by a pathologist 102 (e.g., zooming, reorienting, rotating, or other actions to change the projected image to align with the specimen 106), or automatic adjustment of the projected image 124 to align one or more features of the image with one or more characteristics of the specimen 106 and/or tray 134. For example, a contour of the specimen 106 may be aligned with an imaged contour of the specimen 106 identified in the image obtained by the imager 110. As another example, a tray marker 128B of the tray 134 may be aligned with a projected image tray marker 128B of the image obtained by the imager 110. It should be appreciated that any other matching of characteristics or features, in any combination, may be used to align the projected image 124 with the specimen 106. As a further example, the alignment may also include information associated with specimen orientation relative to a patient from which the tissue was excised, for ease of additional excising. The information associated with specimen orientation relative to a patient may be determined from any of the alignment methods discussed herein. Additionally, the pathology review station 120 may be capable of adapting the projected image 124 to conform to flat specimens and three dimensional specimens, or a combination of flat and three dimensional or warped surfaces. For example, a specimen 106 may be three dimensional while the tray 134 is flat and the projector may adapt portions of the projected image to conform to overlay with both the flat and three dimensional shapes.

Additionally or alternatively, the pathology review station 120 may automatically project an image onto the identified specimen 106 when the specimen 106 is in a projection area 108 of the projector 122 and automatically stop projection when the specimen 106 exits the projection area 108. Automatic projection may occur before or after matching an image with the specimen 106 and/or aligning the image with the specimen 106. In one example, a specimen may be identified as being in the projection area 108 by detecting that a characteristic of the specimen 106 and/or characteristic of the tray 134 are within the projection area 108. In another example, a pathologist 102 may manually turn the projector 122 on or off. If a specimen is detected to be within the projection area 108, the pathology review station 120 may automatically turn on and project a projected image 124 onto the specimen. If the pathology review station 120 has matched an image to the identified specimen 106, then the projected image 124 may be based on the matched image. If there is no image matched in the methods described herein, then the pathology review station 120 may automatically select an image 124 based on other criteria, such as an order in which the images have been obtained by the imager 110, a number of times a specimen 106 has been identified, a selection by the pathologist 102, or any other association that may be made between an image obtained by the imager 110 and the identified specimen 106.

If specimen 106 and the projector 122 move relative to each other, then identification, matching, aligning, and/or projection may need to be re-performed by the pathology review station 120. For example, if the specimen 106 and projector 122 are moved relative to each other, the characteristics used to identify the specimen 106 may need to be adjusted to enable matching of the characteristics with image features, and/or the projection may need to be adjusted or reoriented to accurately overlay the projected image 124 onto the specimen 106, after movement or reorientation.

FIG. 2 depicts an example of a pathology review station 120. As described above with respect to FIG. 1, the projector 122 may be any type of projector with any form of support structure 132. As an example, FIG. 2 shows the projector 122 supported by a structure 132. The structure 132 may include a base (or specimen receiver) 133B to receive a specimen 106 and/or a tray 134 supporting the specimen 106. The may be configured to hold, secure, move, or otherwise position a free-standing specimen 106 base 133B and/or a tray 134. One or more support arms 133A may be used, and may extend from a base 133B of the structure 132, or from any other direction (e.g., a support arm 133A may be positioned above or beside the projector 122 to suspend the projector 122). The support arms 133A of the structure 132 may hold, secure, move, or otherwise position the projector 122 relative to a projection area 108 of the projected image 124. For example, if the structure 132 includes both a base 133B and support arms 133A, then the projector may be positioned relative to the specimen 106 and/or tray 134 received at the base 133B of the structure 132.

As described above, the projected image 124, projected onto the specimen 106 and/or tray 134, may include a projected image marker 128A aligned with a tray marker 128B of the tray 134 and/or a feature 126 of the image aligned with the specimen 106 using a characteristic of the specimen 106 and/or tray 134 and a feature of the image. This alignment analysis may be performed in an operating environment of the pathology review station 120. Additionally, the operating environment may be configured to receive an image of the specimen 106 obtained by the imager 110. As an example, the pathology review station 120 may also have a specimen receiver of the structure 132 configured to receive the tray 134 and/or specimen 106, and a projector 122 configured to project the projected image 124 onto the specimen 106.

FIGS. 3-5 depict aspects of the pathology review station with a single, whole, intact specimen. The pathology review station 220 may be used with a whole, intact specimen 206 when a pathologist is locating and removing a surgical marker encased in the specimen 206. Additionally, outside of pathology, a specimen 206 may be desired to be maintained as a whole, intact piece during analysis, such as in the case of a live specimen or live tissue.

FIG. 3 depicts a specimen 206 setup in a pathology work area 200. As described herein, the specimen 206 may be free-standing in the pathology review station (e.g., pathology review station 220 shown in FIG. 5), or supported by a tray 234. The specimen 206 and the tray 134 may each include a variety of characteristics, as described herein. As an example, FIG. 3 shows a single specimen 206 supported by a tray 234 with the tray including a tray marker 228B.

FIG. 4 depicts a display 218 of an image 236 of a specimen 206. As described herein, the specimen 206 (e.g., specimen 206 in FIGS. 3 and 5) may be imaged by an imager (e.g., similar to imager 110 as described with respect to FIG. 1). A display 218 may show an image 236 obtained by the imager. The display may show the entire image 236 obtained by the imager or portions or features of the image 236 to be projected. The image may have features 226, 228A, as described herein. The image 236 may be the same or different from the projected image (e.g., an x-ray image obtained by the imager may be different than a projection corresponding with an interest area of the specimen). As an example, FIG. 4 shows a display 218 with an x-ray image 236 of the specimen 206 displayed with the features 226, 228A associated with the specimen 206 (e.g., an interest area 226) and the tray (e.g., an imaged tray marker 228A).

FIG. 5 depicts a pathology review station 220 projecting a projected image 224 onto the specimen 206. In an example, a projector 222 of the pathology review station 220 may project a projected image 224 onto a specimen 226. The size, orientation, or other visual aspects of the projected image 224 may be adjusted depending on an orientation and location of the specimen 206, which may depend on the orientation and location of the specimen 206 relative to the projector 222. For example, for clarity, a representation of a cross section 238 of the projected image 224 is depicted away from the projection area 208. It should be appreciated that the cross section 238 is to clarify components of the projected image 224 that may be projected onto the specimen 206. In the example shown in FIG. 5, the projected image 224 may include all features 226, 228A of the image obtained by the imager shown in FIG. 4. In this example, the projected image 224 includes features such as a contour 237 of the specimen 206, an interest area 226 of the specimen, and a projected image marker 228A. It should be appreciated, however, that any number or combination of features may be included in the projected image 224.

The projected image 224 may be projected onto a projection area 208 that, in an example, may be the same size as a tray 234 that may support the specimen 206. The tray 234 may be placed into a specimen receiver 235, which may be sized to fit a particular tray 234 or sized to support a variety of tray sizes. Additionally, the specimen receiver 235 may be adjustable to accommodate for a variety of tray sizes. As an example, the specimen receiver 235 may be the same size as the tray 234 which may be the same size as the projected image 224 as a specified distance away from the projector. The projected image 224 may be matched with the specimen 206, as described herein. As an example, FIG. 5 shows a specimen 206 with an identified characteristic being a contour and/or calcification and a tray 234 having a characteristic of a tray marker 228B. In this example, the projected image 224 is matched with, aligned with, and projected onto, the specimen 206 and the tray 234 such that the projected contour 237 of the specimen 206 aligns with a contour of the specimen 206, the interest area 226 aligns with the interest area on the specimen 206, the projected image marker 228A aligns with the tray marker 228B, and the projection area overlaps a surface of the tray 234. Although FIG. 5 shows specific features of the image being projected onto the specimen 206 via the projected image 224, it should be appreciated that any combination of features of the image may be projected onto the specimen 206 via the projected image 224.

FIGS. 6-8 depict aspects of the pathology review station 320 with a grossed specimen 306. Aspects of FIGS. 6-8 may be described in the context of FIGS. 3-5 and may not necessarily be described further. The pathology review station 320 may be used with a grossed specimen 306 when a pathologist is sampling the specimen slices 306 for further analysis.

FIG. 6 depicts specimen slices 306 of a grossed specimen (e.g., specimen 106, 206). As described herein, the specimen slices 306 may be free-standing in the pathology review station (e.g., pathology review station 320 shown in FIG. 8), or supported by a tray 334. The specimen slices 306 and the tray(s) 234 may include a variety of characteristics, as described herein. Specimen slices 306 may include an additional characteristics over the characteristics that may be included for a single, whole, intact specimen (e.g., specimen 106, 206). One example of an additional characteristic may be mapping of each piece of the specimen slices 306 relative to each other. One or more trays 334 may be used to support the specimen slices 306. As an example, FIG. 3 shows nine specimen slices 306 supported by a single tray 334 with the tray including a tray marker 328B.

FIG. 7 depicts a display 318 of an image 336 of specimen slices 306. As described herein, the specimen slices 306 may be imaged by an imager (e.g., similar to imager 110 as described with respect to FIG. 1). A display 318 may show an image 336, as described herein at least in part with respect to FIG. 4. As an example, FIG. 7 shows a display 318 with an x-ray image 336 displayed with a features 326, 328A associated with the specimen slices 306 (e.g., an interest area 326) and the tray (e.g., an imaged tray marker 328A).

FIG. 8 depicts a pathology review station 320 projecting a projected image 324 onto the specimen slices 306, similar to the pathology review station of FIG. 5. In an example, a projector 322 of the pathology review station 320 may project a projected image 324 onto specimen slices 326. The size, orientation, or other visual aspects of the projected image 324 may be adjusted depending on an orientation and location of the specimen slices 306, which may depend on the orientation and location of the specimen slices 306 relative to the projector 322. For example, for clarity, a representation of a cross section 338 of the projected image 324 is depicted away from the projection area 308. It should be appreciated that the cross section 338 is to clarify components of the projected image 324 that may be projected onto the specimen 206. In the example shown in FIG. 8, the projected image 324 may include all features 326, 328A of the image obtained by the imager shown in FIG. 7. In this example, the projected image 324 includes features such as a map 337 of the specimen slices 306, an interest area 326 of the specimen slices 306, and a projected image marker 328A. It should be appreciated, however, that any number or combination of features may be included in the projected image 324.

FIGS. 9 and 10 illustrate methods that may be performed by the systems described herein. In FIGS. 9 and 10, operations encased in dotted lines may be optional. FIG. 9 illustrates a method 900 for projecting an image onto a specimen (e.g., with the pathology review station systems described herein). Method 900 begins at operation 902 where the pathology review station receives an image obtained by an imager of at least a portion of a specimen, as described herein. The image may be received by an operating environment of the pathology review station. The specimen may be a single, whole, intact specimen, or a grossed specimen with a plurality of specimen slices. Method 900 then proceeds to operation 904 where the pathology review station receives a tray and the specimen in a receiver. The receiver may be a base of a structure or may represent a projection area of the pathology review station. The specimen may be supported by one or more tray(s) when placed into the specimen receiver, or alternatively, the specimen may be placed into the specimen receiver without a tray.

Upon receiving the specimen and the tray in the specimen receiver, the pathology review station may perform a number of optional actions, such as at operation 906 where the pathology review station identifies the specimen in the receiver. This may be performed by an operating environment of the pathology review station. As described herein, the specimen may be identified based on user input, a characteristic of the specimen, or a characteristic of the tray. As further described herein, the characteristic of the specimen may be a contour of the specimen, an interest area on the specimen, or a map of the specimen slices, and a characteristic of the tray may be a grid on the tray or a marker on the tray. Additionally or alternatively, at operation 908, the pathology review station may match the image with the specimen. Matching of the image with the specimen may be performed automatically by the pathology review station, or manually, as described herein. Additionally or alternatively, at operation 910, the pathology review station aligns the projected image relative to the specimen. The alignment may be based on the operation of identifying the specimen (operation 906).

Method 900 ends at operation 912 where the pathology review station projects a projected image onto the specimen, wherein the projected image is based at least in part on the image, as further described herein. The projected image may include the image, or one or more features associated with the image, as described herein.

FIG. 10 illustrates a method 1000 for identifying an image and projecting an image onto a specimen (e.g., with the systems described herein). Method 1000 begins at operation 1002 where the pathology review station identifies a specimen received in a projection area. There may be a single, whole, intact specimen, or a plurality of specimen slices. A specimen or specimen slices may be identified by the pathology review station based on user input, characteristics of the specimen, or characteristics of the tray supporting the specimen, as described herein.

After operation 1002, method 1000 continues to operation 1004 where the pathology review station identifies an image associated with the specimen. The image may be identified manually, using features of the image compared against characteristics of the specimen and/or tray, or other types of automatic selection by the pathology review station, as described herein. This may be similar to matching operation 908 described in FIG. 9. The method 1000 may then perform operation 1006, where the pathology review station aligns the projected image relative to the specimen. The alignment may be based on the operation of identifying the specimen (operation 1004). At operation 1008, the pathology review station may determine that the specimen is within the projection area. This determination may be based on a detection of characteristics of the specimen and/or tray and/or identified features of the image.

Method 1000 ends at operation 1010 where the pathology review station projects a projected image onto the specimen in the projection area, wherein the projected image is based at least in part on the image. If the pathology review station performs operation 1008, then the projection at operation 1010 may be automatic upon a determination that the specimen is within the projection area. The projected image may include the image or one or more features associated with the image, as described herein.

FIG. 11 illustrates an example suitable operating environment for a pathology review station described herein. In its most basic configuration, operating environment 1100 typically includes at least one processing unit (or processor) 1102 and memory 1104. Depending on the exact configuration and type of computing device, memory 1104 (storing, instructions to perform projection of an image onto a specimen) may be volatile (such as RAM), non-volatile (such as RAM, flash memory, etc.), or some combination of the two. This most basic configuration is illustrated in FIG. 11 by dashed line 1106. Further, environment 1100 may also include storage devices (removable, 1108, and/or non-removable, 1110) including, but not limited to, magnetic or optical disks or tape. Similarly, environment 1100 may also have input device(s) 1114 such as keyboard, mouse, pen, voice input, etc. and/or output device(s) 1116 such as a display, speakers, printer, etc. Also included in the environment may be one or more communication connections 1112, such as LAN, WAN, point to point, etc. In embodiments, the connections may be operable to facility point-to-point communications, connection-oriented communications, connectionless communications, etc.

Operating environment 1100 typically includes at least some form of computer readable media. Computer readable media can be any available media that can be accessed by processing unit (or processor) 1102 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 1100 may be a single computer operating in a networked environment using logical connections to one or more remote computers. The remote computer may be a personal computer, a server, a router, a network PC, a peer device or other common network node, and typically includes many or all of the elements described above as well as others not so mentioned. As an example, the operating environment 1100 may be shared between an imager, such as imager 110, and a pathology review station, such as pathology review station 120. As another example, the imager and the pathology review station may each have a unique operating environment 1100. As a further example, the operating environment 1100 may be shared between multiple imagers and/or multiple pathology review stations. The logical connections may include any method supported by available communications media. Such networking environments are commonplace in offices, enterprise-wide computer networks, intranets and the Internet.

As discussed above, augmented reality (AR) systems may be utilized to display the images discussed herein. AR systems may detect or identify a projection area of the pathology review station using methods and systems described herein, including aligning an outline of an x-ray image with a detected outline of a specimen, detecting a characteristic of a specimen and/or a tray, etc. The AR system may operate separately from other components of the pathology review station or may share one or more components, such as components described in the system 100 of FIG. 1 or components described in the example operating environment of FIG. 11. Some specific examples of AR systems for the pathology review station are described below. Although specific examples of AR systems are provided, other AR systems may also be used.

In an example, an AR system may include a wearable device or a device otherwise mountable on the head or body (otherwise referred to as a wearable AR system) of a pathologist using the pathology review station. A wearable AR system may include glasses, goggles, headgear, shoulder-mountable face shields, etc. In an example, processing capabilities of the wearable AR system may be self-contained or otherwise integrated into the wearable AR system. Additionally, the wearable AR system may include one or more cameras coupled with, or integrated into, the wearable AR system. The cameras may capture images or video of a specimen and provide that data to a processor of the wearable AR system. The images or video provided by the camera to the processor may be used to detect or identify a specimen and/or a projection area in the pathology review station, as further described herein. In an instance where the wearable AR system includes lenses, the lenses may be transparent, semi-transparent lenses, or non-transparent. For transparent or semi-transparent lenses, the wearable AR system may virtually project, rather than physically project, a projected image on the lens to overlay the detected specimen and/or projection area that is viewable through transparent or partially transparent lens by the pathologist. Alternatively, for non-transparent lenses, the wearable AR system may display an image or video captured by the cameras to represent the real world and overlay the projected image onto the image or video such that the projected image appears on an image or video of the specimen.

In another example, an AR system may include a display. The AR display may be the same as the display 118 described in FIG. 1. Alternatively, the AR display may be independent from the display 118. For example, an AR display may include a tablet, phone, or any other portable or non-portable display. Similar to the wearable AR system described above, the AR display may be controlled by one or more processors that may be integrated into the AR display or may be communicatively coupled to the AR display. The processing capabilities may be shared between the AR display and the display 118 or may be independent. In addition to the AR display, the AR system includes one or more cameras to capture images or video to send to the processor(s). The cameras may be integrated into the AR display or may be coupled to the AR display and/or the processor(s) via a wired or wireless connection. As further described herein, a specimen and/or a projection area in the pathology review station may be identified or detected, based on the images or video. In an instance where the cameras are not integrated into a portable AR display, the cameras may be positioned near or inside the pathology review station such as to include the specimen and/or projection area inside of a view of the cameras. The cameras may be fixed or movable in a position relative to components of the pathology review station. For example, the cameras may be positioned overhead to capture a top-down view of the pathology review station, mountable to a table, display, or imager, mountable to a pathologist, or otherwise positionable or mountable near the pathology review station. The AR system may display an image or video captured by the cameras on the AR display and overlay the projected image onto the image or video feed on the AR display such that projected image appears on an image or video of the specimen.

As should be appreciated, while the above methods have been described in a particular order, no such order is inherently necessary for each operation identified in the methods. For instance, the operations identified in the methods may be performed concurrently with other operations or in different orders. In addition, the methods described above may be performed by the systems described herein. For example, a system may have at least one processor and memory storing instructions that, when executed by the at least one processor, cause the system to perform the methods described herein.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for projecting an image onto a specimen, the method comprising:

receiving an x-ray image from an x-ray imager of at least a portion of a specimen, the x-ray image including a specimen feature not visible on the specimen;

receiving a tray supporting the specimen in a receiver of a pathology review station;

identifying the specimen in the receiver based on a characteristic of the specimen being a contour of the specimen; and projecting a projected image onto the specimen at the receiver, wherein the projected image comprises at least a portion of the x-ray image having the specimen feature, and wherein the projected image is aligned relative to the specimen at the receiver based at least partially on the identified contour of the specimen.

2. The method of claim 1, wherein the projected image comprises the x-ray image.

3. The method of claim 1, wherein the specimen is a plurality of specimen slices.

4. The method of claim 1, wherein the projected image further comprises a recommended incision line.

5. A computer-implemented method of projecting an image onto a specimen, the method comprising:

receiving an x-ray image from an x-ray imager of at least a portion of a specimen, the x-ray image including a specimen feature not visible on the specimen;

identifying the specimen received in a projection area of a pathology review station, wherein the identification of the specimen is based on a characteristic of the specimen being a contour of the specimen;

identifying the x-ray image associated with the specimen received at the pathology review station from the x-ray imager; and projecting a projected image onto the specimen in the projection area, wherein the projected image comprises at least a portion of the x-ray image having the specimen feature, and wherein the projected image is aligned relative to the specimen at the pathology review station based at least partially on the identified contour of the specimen.

6. The method of claim 5, the method further comprising:

determining that the specimen is within the projection area; and based on the determination that the specimen is within the projection area, automatically projecting the projected image onto the specimen.

7. The method of claim 5, wherein the projected image comprises the x-ray image.

8. The method of claim 5, wherein the projected image further comprises a recommended incision line.

9. The method of claim 5, wherein the specimen is a plurality of specimen slices.

10. A pathology review station comprising:

a specimen receiver configured to receive a specimen;

a processor;

memory storing computer executable instructions that, when executed by the processor, cause the pathology review station to perform a set of operations comprising:

receiving an x-ray image of a specimen from an x-ray imager, the x-ray image including a specimen feature not visible on the specimen;

identifying the specimen based on a characteristic of the specimen being a contour of the specimen; and generating a projected image comprising at least a portion of the x-ray image having the specimen feature, wherein the projected image is aligned relative to the specimen based at least partially on the identified contour of the specimen; and a projector configured to project the projected image onto the specimen within the specimen receiver.

11. The pathology review station of claim 10, wherein the specimen receiver is further configured to receive a tray supporting the specimen.

12. The pathology review station of claim 10, wherein the pathology review station and the x-ray imager are housed in a single unit.

13. The pathology review station of claim 10, further comprising a support stand, the support stand configured to position the projector above the specimen receiver.

* * * * *